United States Patent [19]

Frye

[11] Patent Number: 4,715,624
[45] Date of Patent: Dec. 29, 1987

[54] PLASTIC TO METAL TRANSITION FITTING

[76] Inventor: Henry A. Frye, 16112 Tortola Cir., Huntington Beach, Calif. 92649

[21] Appl. No.: 884,789

[22] Filed: Jul. 11, 1986

Related U.S. Application Data

[60] Division of Ser. No. 747,839, Jun. 24, 1985, which is a continuation-in-part of Ser. No. 318,219, May 24, 1982, abandoned.

[51] Int. Cl.⁴ ............................................. F16L 21/02
[52] U.S. Cl. .................................... 285/55; 285/174; 285/281; 285/302; 285/351
[58] Field of Search ............... 285/174, 302, 351, 238, 285/233, 234, 101, 55, 15, 281

[56] References Cited

U.S. PATENT DOCUMENTS

| 2,776,151 | 1/1957 | Harkenrider | 285/174 |
| 3,236,543 | 2/1966 | Mueller | 285/174 X |
| 3,724,878 | 4/1973 | Ford | 285/233 X |
| 4,279,435 | 7/1981 | Alewitz | 285/47 X |
| 4,284,297 | 8/1981 | Godkin | 285/47 |
| 4,386,796 | 6/1983 | Lyall et al. | 285/302 X |

FOREIGN PATENT DOCUMENTS

| 637025 | 2/1962 | Canada | 285/302 |
| 2419393 | 11/1979 | France | 285/302 |
| 2451456 | 11/1980 | France | 285/302 |
| 867989 | 5/1961 | United Kingdom | 285/302 |

Primary Examiner—Thomas F. Callaghan
Attorney, Agent, or Firm—George J. Netter

[57] ABSTRACT

A section of metal pipe has one end connected to a main line pipe. A hollow cylindrical plastic piston having a plurality of O-rings thereabout is slidingly and sealingly received within the open end of the metal section. A plastic carrier pipe is fixedly received within the outwardly facing end of the piston for suitable interconnection to other equipment. First and second limits are spaced along the pipe section to locate the piston within the pipe section. These limits may be flanges machined into the pipe section, or the pipe section may be rolled so as to include an inwardly directed, circumferentially extending ridge. In a further version, the transition joint is incorporated into a riser arrangement in which the plastic carrier is located within an outer tubing or pipe and held spaced from the tubing walls throughout the entire length of the tubing. Also, replacement of a service line is accomplished by threading plastic pipe through original line and terminating via transition joints at each end.

3 Claims, 13 Drawing Figures

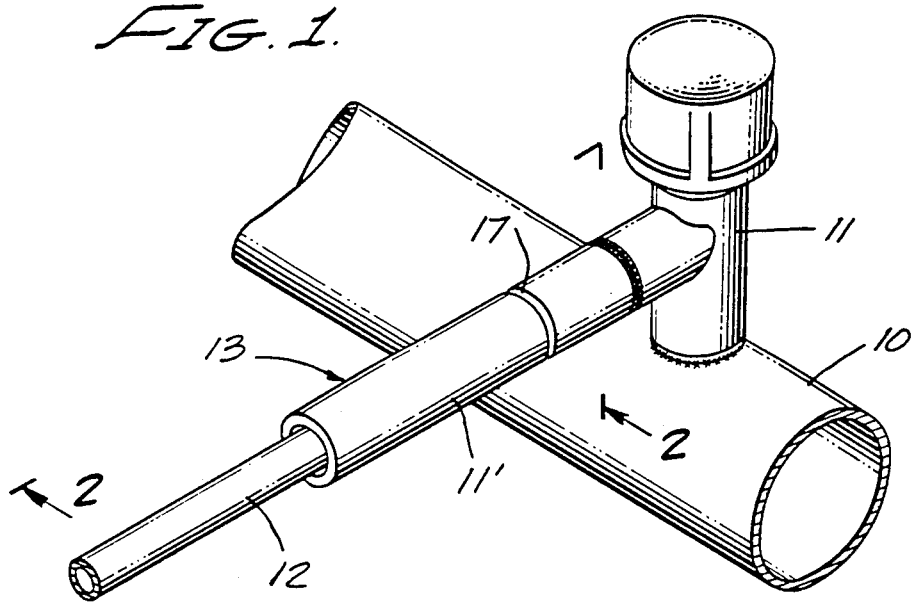
FIG. 1.
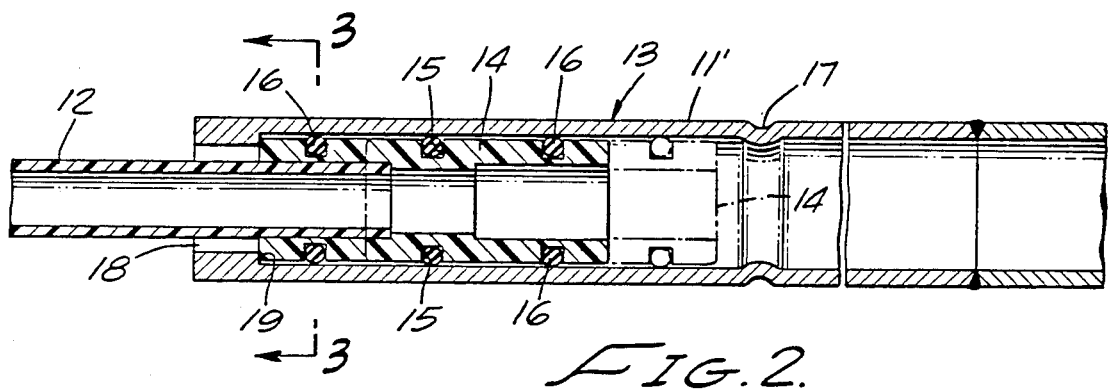
FIG. 2.
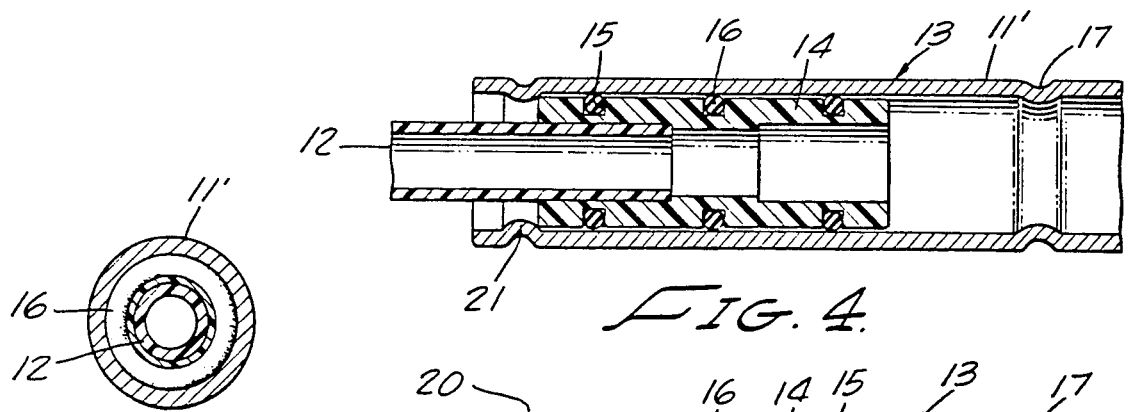
FIG. 3.
FIG. 4.
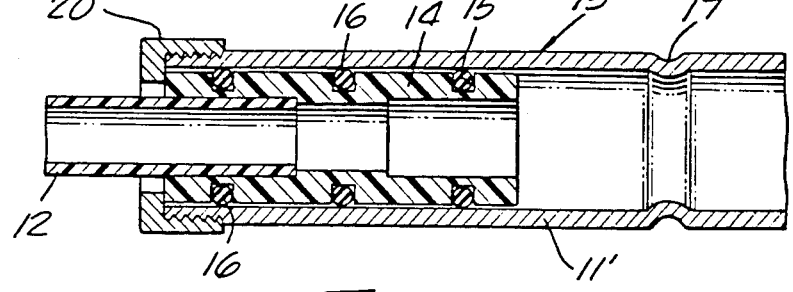
FIG. 5.

PIPING TO REGULATOR AND METER

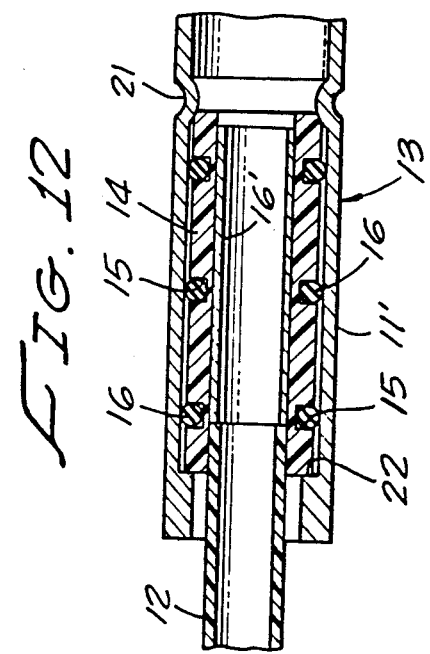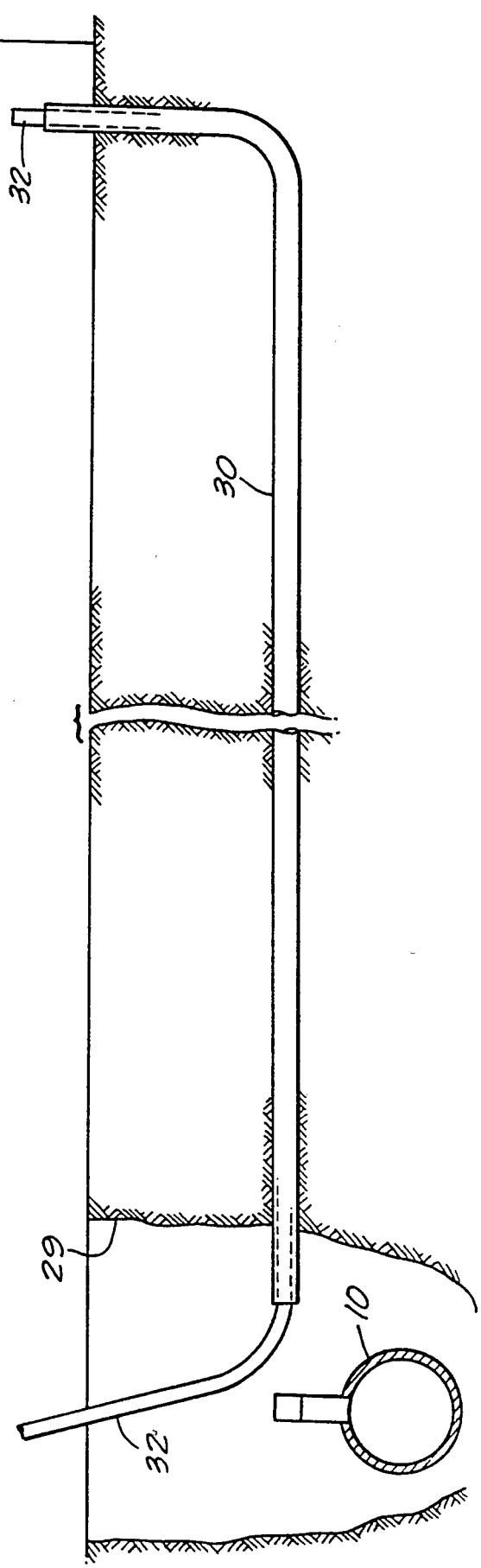

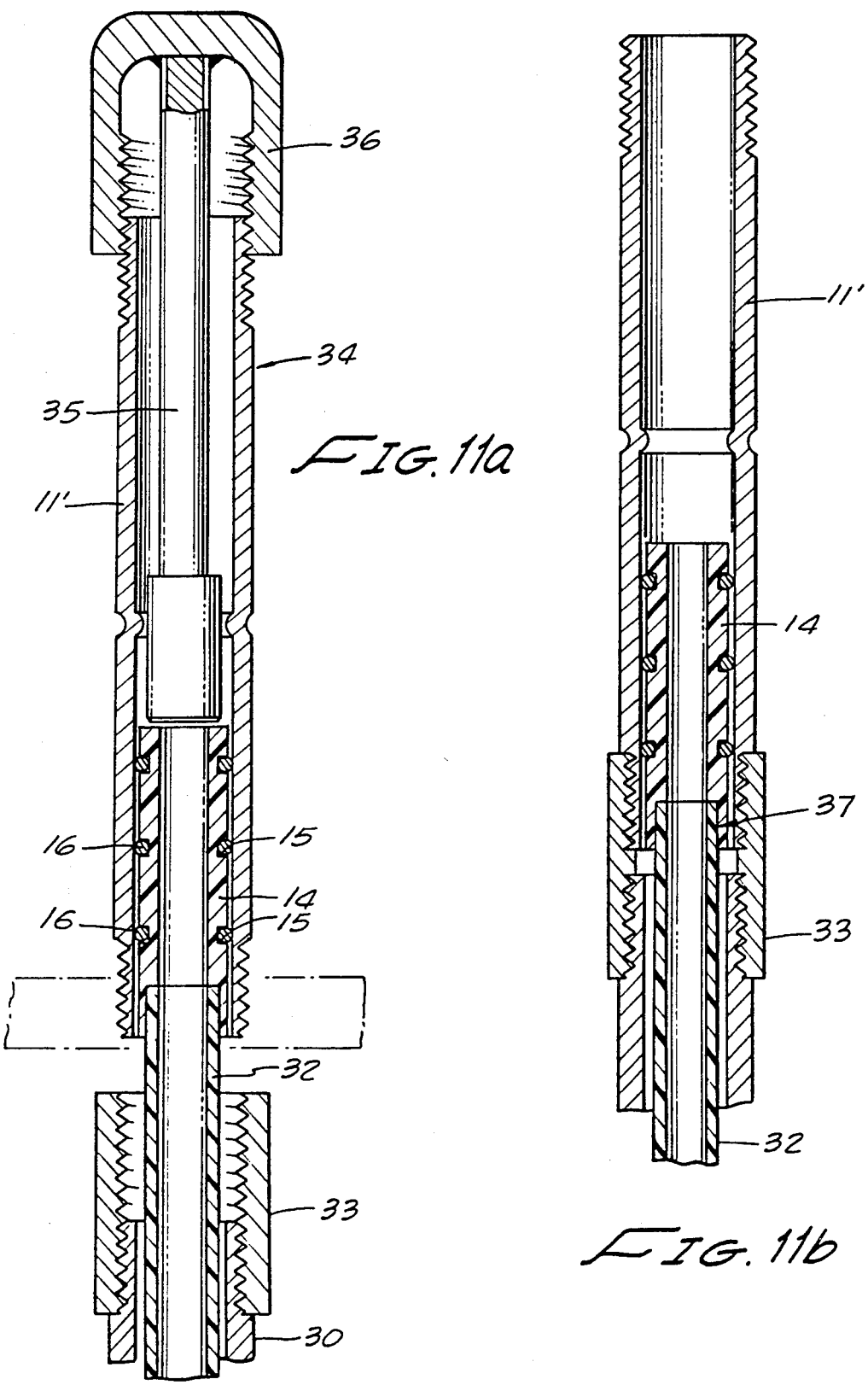

ized sealing relation between the two. For example, in the supplying of natural gas, it is customary,

PLASTIC TO METAL TRANSITION FITTING

This is a division of application Ser. No. 747,839 filed June 24, 1985, which is a continuation-in-part of Ser. No. 318,219, filed May 24, 1981, now abandoned.

The present invention relates generally to a transition fitting for use in interconnecting metal to plastic pipe, and, more particularly, to an improved plastic to metal transition fitting which is of relatively simplified construction, inexpensive to manufacture and easy to install in situ.

BACKGROUND OF THE INVENTION

There is an ever increasing need for providing reliable interconnections between plastic and metal pipe which are effective over a wide temperature range to maintain good sealing relation between the two. For example, in the supplying of natural gas, it is customary, at the present time, that the main lines located in the street are constructed of steel whereas feeder or service lines to houses and adjacent buildings are most frequently constructed of a plastic, such as polyethylene. Also, it is required that steel pipe be used above ground in making connections to gas regulators and meters, which frequently interconnect the underground plastic pipe to the main via so-called "risers". Still further, steel line extensions commonly join to plastic mains. In each of these situations, it is necessary to provide a suitable transition fitting that will accommodate both the plastic and steel pipes. The primary obstacle that a successful transition fitting must overcome is the considerable difference in temperature coefficients of expansion of the two materials. Although actual expansion rates will depend upon a particular plastic, in general it can be shown that plastics used in manufacturing pipe have an expansion coefficient of four to five times that of steel. Therefore, where the ambient temperature range is extensive a satisfactory transition fitting must accommodate for the "working" of the pipes and interconnection parts resulting from the unequal expansion and contractions, in order to preserve the interconnection between the two, as well as to prevent breakage or damage. Most known past transition fittings for this purpose have been compression fittings and when plastic is compressed there is a tendency for it to cold-flow with the concomitant reduction in holding strength and the increased possibility of leakage. Other transition fitting designs hold the plastic in contact with the steel firmly and do not allow the plastic to move thereby preventing the plastic pipe from relieving thermal or other stresses.

SUMMARY OF THE INVENTION

In the practice of the present invention, a section of metal feeder pipe has one end conventionally threaded, welded or otherwise affixed to the main line pipe, for example. A hollow cylindrical plastic piston-like member containing an internal metal stiffener sleeve having a plurality of O-rings thereabout is received within the open end of the metal feeder pipe section, the cross sectional dimensions of the member and O-rings being such as to provide a sliding sealing relation between the inner pipe section wall. A plastic carrier is fixedly received within the outwardly facing end of the piston-like member for suitable interconnection to other equipment. First and second means are spaced along the pipe section to serve as limits for movement of the piston-like member along the longitudinal axis of the pipe section. These limits may consist of special flanges being machined into the pipe section, or, alternatively, the pipe section itself may be rolled so as to include an inwardly directed, circumferentially extending ridge. The outermost stop may be provided by a separate cap that is threaded onto the pipe.

In a first version, the limit stops are arranged so as to permit little or no relative longitudinal movement of the piston-like member while not restricting rotation of the member and a certain amount of transverse movement.

In accordance with a second version of the invention, the limit stops are so arranged as to provide an extensive length of the pipe section through which the piston-like member may move longitudinally on dissimilar expansion of the plastic and metal parts or to relieve mechanical stresses which are developed in the pipes from other sources, such as from direct pressure contact made with the plastic pipe.

In a still further version, the invention is incorporated into a riser arrangement in which the plastic carrier is located within an outer tubing or pipe and held spaced from the tubing walls throughout the entire length of the tubing.

In accordance with another aspect, a described transition fitting enables replacing an existing riser extending underground from a street main to a meter, for example, at an adjacent building with a minimum of cost and labor. Only a single access hole is required at the street main where a plastic pipe is inserted into the existing piping and forced along through the riser until its end is adjacent the meter, a portion of the existing riser adjacent the meter having been previously removed. the transition joint interconnects the meter and the upper end of the new plastic pipe with a stopcock and regulator, for example.

DESCRIPTION OF THE DRAWINGS

FIG. 1 is a perspective view of a main fluid carrying line showing a transition fitting of this invention therewith.

FIG. 2 is a sectional elevational view taken along the line 2—2 of FIG. 1.

FIG. 3 is an end elevational, sectional view taken along line 3—3 of FIG. 2.

FIG. 4 is a view similar to FIG. 2 of an alternate embodiment.

FIGS. 5 and 6 are views similar to FIG. 4 of still a further version of the invention.

FIG. 10 depicts in sectional view the replacement of a riser in accordance with the present invention.

FIGS. 11a and 11b show the method of affixing a described transition joint to the replacement riser of FIG. 10.

FIG. 12 is a view similar to FIG. 6 of an alternate embodiment.

DESCRIPTION OF A PREFERRED EMBODIMENT

Figure 6:
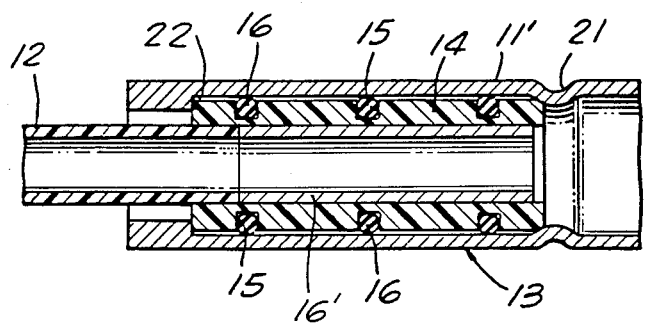

With reference now to the drawings and particularly FIG. 1, there is shown a perspective view of the present invention interconnected to a main gas line exemplary of one use thereof. More particularly, the main gas line indicated generally as at 10 is typically constructed of steel and at spaced intervals therealong includes pipe T-sections 11 welded to the main line for supplying gas through main line extensions or lines to adjacent houses or buildings. The feeder lines each consists of a plastic pipe 12 having one end interconnected to the various household equipment and gas measuring equipment via the transition fittings enumerated generally as at 13 and to be described herein, and its other end to T-section 11.

Turning now to FIG. 2, located within an inner end of a pipe section 11' is a hollow cylindrical piston-like member 14 having an outer diameter slightly less than the inner diameter of the pipe section 11'. A plurality of circumferentially extending grooves 15 include O-rings 16, the overall dimension of the cylinder 14 and O-rings 16 being such as to provide a snug sealing fit within the pipe section while, at the same time, enabling both rotation and sliding movement of the piston member with respect to the pipe section.

Although other materials may be found suitable, best results to date have been achieved by constructing the piston 14 of polyethylene and the O-rings of a rubber-like material such as neoprene. The plastic piston also has an internal metal stiffener sleeve 16' to provide dimensional stability underneath the O-rings.

The plastic carrier or pipe 12 is sealingly secured within the bore of the piston 14 and extends outwardly from the pipe section for interconnection to metering or other externally located equipment. Satisfactory means of securing the plastic pipe within the piston member can be threads, a suitable cementious material, heat fusion or combination thereof.

As shown in FIG. 2, the pipe section includes means 17 located inwardly spaced from the outermost open end 18 of the pipe section and serving as an inner limit stop for the piston-like member. Also, at the outer end of the pipe section, a further means 19 are provided to prevent withdrawal of the piston-like member from the pipe section.

One suitable technique for providing the inner limit stop means 17 is to roll the pipe producing an external groove thereabout which deforms the pipe wall inwardly to produce an internal circumferential ridge. Such a limit stop means is shown in FIGS. 2, 4, 5 and 6. The limit stop means 19 in the FIG. 2 version consists of a shoulder formed in the inner wall surface of pipe section 11' closely adjacent the open end 18.

Alternatively, an additional limit stop means for preventing withdrawal of the piston member from the pipe section can be a cap 20 that is threaded onto the outer end of the pipe section (FIG. 5). Still further, the outer end margin of the pipe section may be rolled to provide an inwardly directed ridge 21 to serve as an outer end limit stop for the piston 14 (FIG. 4).

In accordance with the first embodiment of the present invention shown in FIG. 2, the two limit stops in the pipe section are spaced apart along the pipe section an amount substantially greater than the length of the member 14. As a result of this, differences in thermal expansions and contractions between the plastic carrier 12 and member 14, on the one hand, and the metal pipe section 11' and pipe 10, on the other hand, are taken up by movement of the piston-like member 14 along the pipe section as shown by the dashed-line depiction of member 14.

In addition, rotation of member 14 within the pipe section typically occurs during initial installation and can occur subsequently as a result of the different thermal coefficients of expansion for the metal and plastic parts. This ability to rotate and thereby relieve torsional stresses between the plastic and metal parts is important in that unrelieved torsional stressing of the plastic produces cracks which result in physical and gas or fluid sealing failure.

Turning now to FIG. 6, member 14 in this embodiment is seen to be substantially confined within pipe section 11' against longitudinal movement therein by the combined action of a rolled inner limit stop 21 and the shoulder 22 serving as an outer limit stop. The member 14 is, however, free to rotate within the pipe section. This version is especially for use wherever ambient temperature variations experienced are not extreme, or where the length of the plastic carrier 12 is not so great as to produce excessively large increases in length during expected temperature increases. In addition, to being less expensive and simpler than known prior art transition fittings, it is believed to provide more reliable sealing as well as relieving any torsional stresses.

All of the versions described to this point have included three (3) O-rings 16 about the piston-like member. If the inner wall of the pipe section were clean and smooth, one O-ring would be satisfactory under normal use. However, it is not unusual for the exterior walls of such pipe sections to have dirt, dust and foreign particles of great variety on them, which can interfere or even destroy the seal between an O-ring and the pipe section wall surface. Accordingly, in the described construction it is believed the outermost O-rings serve to wipe the wall surface clean and the central O-ring establishes the requisite sealing relationship.

To insure that good sealing relation is maintained between the O-rings 16 and the surrounding metal pipe, the interior pipe wall must be finished off to a high degree of smoothness. If normal commercial grade steel pipe is used for the pipe section 11', it will then be necessary to turn down the interior wall surface in order to achieve the requisite smooth surface against which the O-rings can seal. The seal is further enhanced applying a silicone lubricant to the internal surface of the metal pipe.

Figure 8:
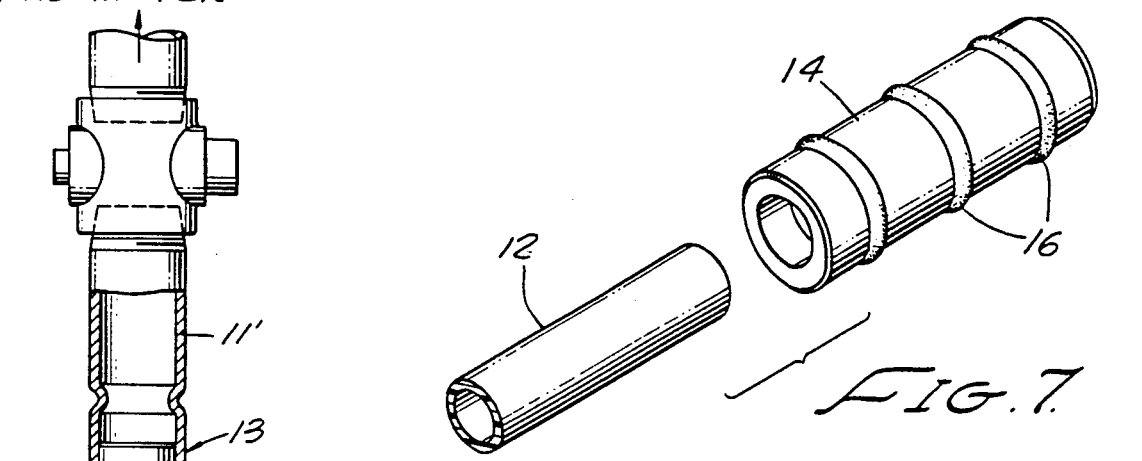
FIG. 8 shows the invention in the form of a riser.
Figure 8:
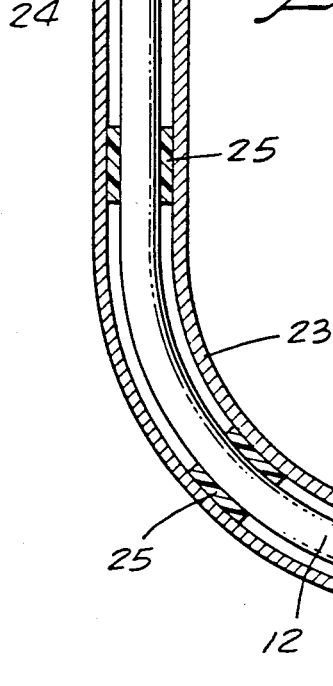
Figure 7:
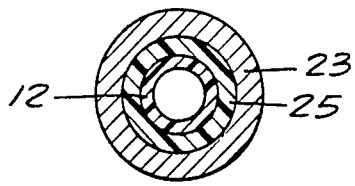
FIG. 7 is a perspective view of the piston-like member and carrier shown disassembled from the fitting.
Figure 9:
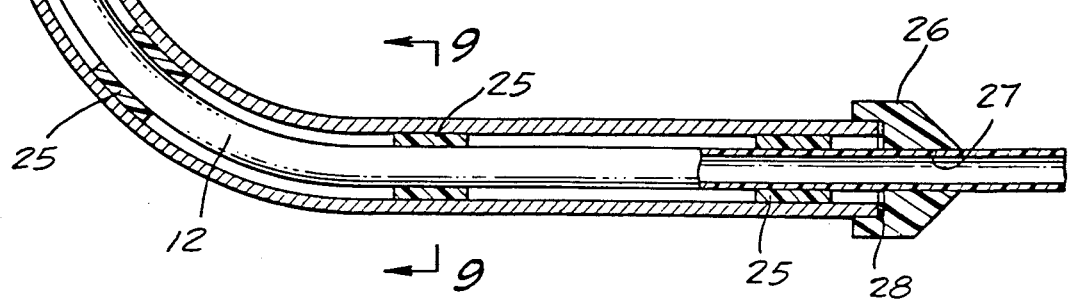
FIG. 9 is an end elevational, sectional view taken along line 9—9 of FIG. 8.

FIG. 8 shows the use of the invention in what is referred to as a riser. More particularly, as in the previously described versions the riser includes a metal pipe section 11' connected via a stopcock to the regulator and meter of a home, for example. A piston-like plunger 14 with a plastic carrier 12 are also provided, as before. A coated metal casing 23 of diameter substantially the same as pipe section 11' is secured to the pipe section by welding as at 24, for example. The carrier, which has a substantially smaller diameter than the casing 23, is maintained in spaced relation to the casing walls by a plurality of plastic cylindrical members 25 each having an axial bore for accommodating the carrier. The outer end of the casing is closed off by a cap 26 that fits tightly over the casing open end and includes an opening 27 through which the carrier 12 extends. A suitable moisture sealant 28 is provided on the interior of the cap 26 to prevent the ingress of moisture.

The arrangement of the plastic carrier 12 within a casing 23 serves to keep the maximum temperature of the carrier lower than if it were in direct contact with the soil, for example. That is, whereas the casing is a relatively good conductor of heat, the plastic spacers are not, and the air within the casing is also a poor conductor.

In the ensuing paragraphs, an especially advantageous application of the present invention is described in connection with replacing a gas service line. At the present time, the usual procedure involved in replacing a gas service line for a domestic user is to insert a new plastic (e.g. polyethylene) tubing from the main which is at the street, through the old existing pipe for example, to the meter location closely adjacent the house. This requires a new riser to be joined to the plastic service tubing and interconnected with the piping to the regulator and meter. To accomplish this two bell holes must be dug, one at the point of juncture with the main and the other adjacent the meter.

However, by utilizing the present invention only one bell hole needs to be dug (i.e., at the street main) and the existing riser may be used thereby greatly reducing the overall labor and expense normally involved in replacement of a service line.

As an initial step, a hole 29 is dug down to the point at which the service line 30 interconnects with the main "T". The service line is broken adjacent the "T" and also broken at the opposite end at a point above ground and substantially spaced from a meter 31, or other external connection point. Next, a suitable length of plastic pipe 32 is inserted into service line 30 at the street end and threaded therealong until an end portion appears at the opposite end. In a way that will be more particularly described a transition fitting of the present invention is used to interconnect the new service line with the meter and also to interconnect the main "T" with the service line. Accordingly, a new service line has been replaced with only a single access hole having to be dug as contrasted with standard prior techniques requiring digging two such holes and replacing the entire riser at the meter end.

As can be seen best in FIGS. 11A and 11B, the first step in applying a transition joint to the free end of the replacement service line or pipe 32 is to thread a steel coupling 33 onto the end of the existing riser or line with the pipe 32 extending outwardly therefrom. A piston member 14 outfitted with O-rings 16 is then suitably located within a pipe section 11'. A special tool 34 having an elongated plunger 35 with an internally threaded cap 36 at one end is threaded onto the upper end of the pipe section 11', the inner plunger end serving as means for properly locating and temporarily securing the piston member 14 within the pipe section. The end of the plastic pipe 32 is forced into the piston member bore and a heat-fused joint is formed as at 37 by known means. The tool 34 is removed, the lower end of pipe section 11' is threaded into coupling 33, and the pipe section opposite end is threaded into the meter via a stopcock and regulator.

A further transition may be used to interconnect the new service line 32 to the main "T" in the manner just described in the preceding paragraph. Either embodiment of described transition joint can be used in replacing a service line with advantageous results.

I claim:

1. A transition fitting for interconnecting synthetic plastic pipe with a larger metal pipe which automatically compensates for thermal expansion and force related differentials between the plastic pipe and metal pipe, comprising:

a metal pipe section of outer diameter substantially equal to that of the metal pipe, one end portion of the pipe section formed to permit welded abutment with an end of the metal pipe, and a shoulder formed on an inner wall surface adjacent the pipe section other end;

a cylindrical plastic member slidingly received within the pipe section having a first end abutting against the metal pipe section shoulder, said member having an axial opening extending completely therethrough, one end portion of said member opening having a diameter substantially identical to the plastic outer pipe diameter and adapted to be sealingly secured thereto;

O-ring means on the circumferential surface of the cylindrical plastic member contacting the pipe section internal wall for establishing a movable seal therebetween;

a metal sleeve affixed within the cylindrical plastic member axial opening and continuously engaging the plastic member walls defining said axial opening and underlying the O-ring means, an end of the metal sleeve forming a shoulder in the plastic member axial opening against which the plastic pipe abuts; and an inwardly directed ridge rolled into the metal pipe section engaging the second end of the plastic member for securing the cylindrical plastic member against longitudinal movement while allowing rotational movement between the metal pipe section and plastic member.

2. A transition fitting as in claim 1, in which there are further provided a metal tubular casing surrounding a length of the plastic pipe, means received within the casing for holding said plastic pipe spaced from the casing, and a cap sealingly enclosing one end of the casing to the plastic pipe, the other end of the casing being affixed to the metal pipe section.

3. A transition fitting as in claim 2, in which the means for holding the plastic pipe spaced from the casing include cylindrical members slidingly received onto said plastic pipe.

* * * * *